United States Patent
Harsh et al.

(10) Patent No.: US 8,863,166 B2
(45) Date of Patent: Oct. 14, 2014

(54) METHOD AND SYSTEM FOR DETECTING NON-POWERED VIDEO PLAYBACK DEVICES

(75) Inventors: Aaron Harsh, Portland, OR (US); Amir Yazdani, Portland, OR (US); Michael Vinson, Piedmont, CA (US); Bruce Goerlich, Forest Hills, NY (US)

(73) Assignee: Rentrak Corporation, Portland, OR (US)

( * ) Notice: Subject to any disclaimer, the term of this patent is extended or adjusted under 35 U.S.C. 154(b) by 0 days.

(21) Appl. No.: 13/081,437

(22) Filed: Apr. 6, 2011

(65) Prior Publication Data

US 2012/0260280 A1 Oct. 11, 2012

(51) Int. Cl.
| | |
|---|---|
| *H04H 60/32* | (2008.01) |
| *H04N 21/442* | (2011.01) |
| *H04N 21/658* | (2011.01) |
| *H04N 21/24* | (2011.01) |
| *H04N 21/25* | (2011.01) |

(52) U.S. Cl.
CPC ......... *H04N 21/24* (2013.01); *H04N 21/44222* (2013.01); *H04N 21/658* (2013.01); *H04N 21/91* (2013.01); *H04N 21/252* (2013.01)
USPC .......... 725/21; 725/9; 725/10; 725/13; 725/14

(58) Field of Classification Search
None
See application file for complete search history.

(56) References Cited

U.S. PATENT DOCUMENTS

| | | | |
|---|---|---|---|
| 4,264,925 A | 4/1981 | Freeman et al. | |
| 4,355,372 A | 10/1982 | Johnson et al. | |
| 4,603,232 A | 7/1986 | Kurland et al. | |
| 5,023,929 A | 6/1991 | Call | |
| 5,523,851 A | 6/1996 | Leshem | |
| 5,675,510 A | 10/1997 | Coffey et al. | |
| 6,070,145 A | 5/2000 | Pinsley et al. | |
| 6,098,048 A | 8/2000 | Dashefsky et al. | |
| 6,115,680 A | 9/2000 | Coffee et al. | |
| 6,212,327 B1 | 4/2001 | Berstis et al. | |
| 7,039,928 B2 | 5/2006 | Kamada et al. | |
| 7,882,514 B2 | 2/2011 | Nielsen et al. | |
| 7,954,120 B2 | 5/2011 | Roberts et al. | |
| 2002/0129368 A1* | 9/2002 | Schlack et al. | 725/46 |
| 2003/0039467 A1 | 2/2003 | Adolph et al. | |
| 2006/0075420 A1* | 4/2006 | Ludvig et al. | 725/9 |

(Continued)

FOREIGN PATENT DOCUMENTS

KR 10-2006-0114898 A 11/2006

OTHER PUBLICATIONS

International Search Report and Written Opinion for Application No. PCT/US2012/032564, Date Mailed Nov. 28, 2012, 9 pages.

(Continued)

*Primary Examiner* — Cai Chen
(74) *Attorney, Agent, or Firm* — Perkins Coie LLP

(57) ABSTRACT

A method and system for identifying tune data from set top boxes associated with televisions, video monitors, or other video playback devices that are likely powered off. In some embodiments, survival curves are constructed that predict a length of time before a video playback device is powered off after a tuning event. The survival curves are used to predict the likelihood that a video playback device is powered off. Viewership estimates made from tune data reported from set top boxes can be adjusted to take account of the video playback devices that are predicted to be powered off.

27 Claims, 6 Drawing Sheets

(56) References Cited

U.S. PATENT DOCUMENTS

| | | |
|---|---|---|
| 2006/0075421 A1 | 4/2006 | Roberts et al. |
| 2007/0083882 A1* | 4/2007 | Nielsen et al. .............. 725/9 |
| 2007/0199013 A1 | 8/2007 | Samari et al. |
| 2008/0148309 A1 | 6/2008 | Wilcox et al. |
| 2009/0234649 A1 | 9/2009 | Goodhew |
| 2010/0318406 A1 | 12/2010 | Zazza et al. |
| 2010/0319018 A1 | 12/2010 | Zazza |
| 2010/0319019 A1 | 12/2010 | Zazza |
| 2012/0078682 A1 | 3/2012 | Pinsley et al. |

OTHER PUBLICATIONS

Final Office Action for U.S. Appl. No. 13/686,762, Mail Date Oct. 15, 2013, 13 pages.

Final Office Action for U.S. Appl. No. 13/686,762, Mail Date Jul. 9, 2014, 18 pages.

* cited by examiner

METHOD AND SYSTEM FOR DETECTING NON-POWERED VIDEO PLAYBACK DEVICES

BACKGROUND

In video media distribution systems, estimates are often made of how many viewers have seen a particular program or were watching a particular channel. The viewership information can be used for a variety of purposes, but is often used by networks and other content providers to set rates for show advertisers. Although viewership estimates are accepted by the industry, advertisers have always sought improved viewership information to facilitate the selection of programs on which to advertise. Improved information allows advertisers to ensure that they are paying an accurate amount for the audience that they are reaching. Improved information also allows advertisers to better target desired audiences that they are trying to reach.

Conventional methods for estimating viewership information include using special receivers that record what programs and channels a user has seen or by asking a selected set of viewers in representative markets to record their viewing information using paper or electronic logs. Both methods can be inaccurate if, for example, the number of viewers that are sampled is too small or if the sample set does not accurately reflect the overall viewership for a wider broadcast region. Moreover, errors can also creep into the records maintained by viewers, thereby providing erroneous estimates.

An alternative method to estimate viewership is to use the return-path capability of video-content hardware platforms already existing in many TV households. The return-path is used to measure—passively and invisibly—the viewing choices and behavior of a large subset of the viewers in a given region. There are, however, many challenges in converting this raw data into useful audience viewership measurements. One of those challenges is to estimate when the return-path device is left on when the TV or other video monitor is turned off

DETAILED DESCRIPTION

A system and method to predict when televisions, video monitors, or other video playback devices (each of which is referred to herein as a "video playback device") have been powered off in order to improve the estimation of viewership of presented content is disclosed herein. A content presenter provides tune data available that indicates each time a user interacts with the video device (for example, changes a channel, calls up an interactive program guide etc.) on a video playback device. Such tune data is typically provided by an internal tuner or an external set top box that is associated with, or incorporated in, the video playback device. The tune data is sent back to a central processing and storage location where a computing system analyzes the tune data to identify video playback devices associated with set top boxes that are likely powered off, even though it appears from the tune data that the video playback devices are tuned to a particular channel. The tune data from set top boxes associated with video playback devices that are identified as likely being powered off can be factored out of the viewership analysis. For example, the tune data from set top boxes associated with video playback devices that are likely powered off can be ignored in calculations of audience viewership.

In some embodiments, the computing system generates "survival curves" that are utilized to estimate when video playback devices are likely powered off. To generate survival curves, the computing system identifies a number of reliable set top boxes from the tune data. From the tune data associated with the identified reliable set top boxes, survival curves are computed that indicate a probability versus time that a video playback device is powered off after a tuning event. The survival curves are used to estimate subsets of tune data from set top boxes that are associated with video playback devices that are likely powered off.

Various embodiments of the invention will now be described. The following description provides specific details for a thorough understanding and an enabling description of these embodiments. One skilled in the art will understand, however, that the invention may be practiced without many of these details or with variations which are not specified here but which follow from the description in a way that will be clear to one skilled in the art. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
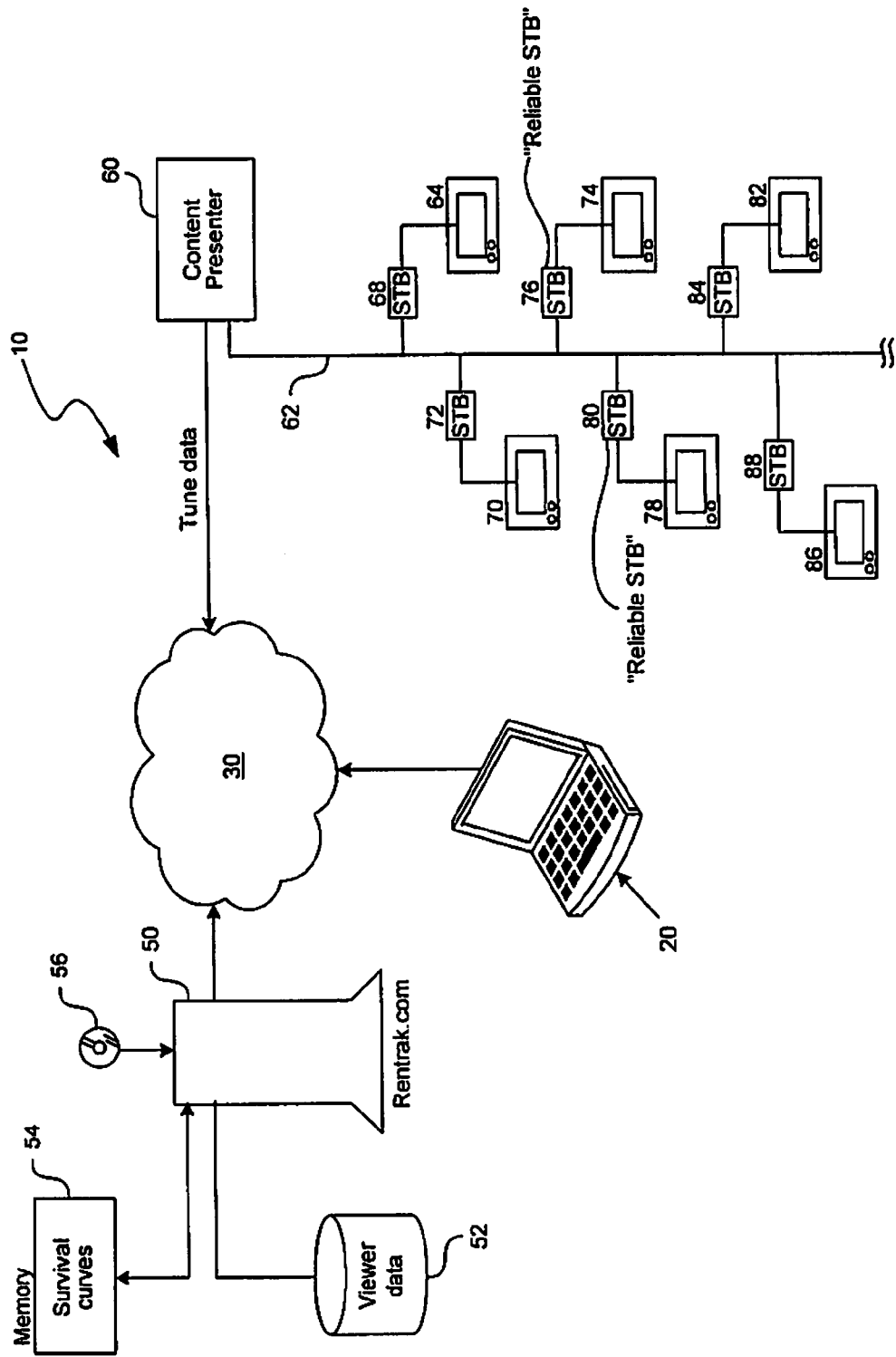
FIG. 1 illustrates a system for estimating viewership information.

As shown in FIG. 1, a viewing estimation system 10 includes a computing system 50 that is configured to receive tune data from one or more content presenters 60. In the embodiment shown, the content presenter 60 is a cable television operator that transmits program signals on a cable 62. Content presenters include, but are not limited to, satellite television ("digital broadcast satellite") operators, local or regional broadcasters, and distributors of content over other transmission media. A number of subscribers view the program signals on televisions, video monitors, or other audio/video playback devices 64, 70, 74, 78, 82, 86, (each of which is simply referred to herein as a "video playback device"). Each of the video playback devices is associated with a corresponding internal tuner or external set top box (STB) 68, 72, 76, 80, 84, 88 etc. that serves as an interface between the subscriber's video playback device and the cable 62 or other transmission means on which the television program or other audio-video content is transmitted.

In some embodiments, the set top boxes 68, 72, 76, 80, 84, 88 comprise cable television converters or satellite dish receivers. However, the set top boxes could also be digital video recorders (DVR), gaming consoles, or other electronic components which allow a user to tune to a desired audio/video stream. Broadly stated, the phrase "set top box" is used herein to refer to any device, component, module, or routine that enables tune data to be collected from an associated video playback device. Set top boxes may be stand-alone devices or set top box functionality may be incorporated into the video playback devices.

The content presenter 60 has the ability to receive signals indicative of tuning and other events from each of the set top boxes. The tuning events can represent such things as channel changes, recording or playing back programs that are transmitted to a set top box, and changes in play back, such as when a subscriber pauses, fast forwards or rewinds a program or otherwise varies its normal playback. In addition, the tuning events may indicate when a subscriber requests information from an interactive television subscription service. The tuning event data is collected by the content presenter 60 from each of the set top boxes and is provided to the computing system 50 as tune data. Tune data is associated with a particular set top box based on, for example, an identifier in the tune data that identifies the set top box. The tune data can be transmitted over a computer communication link 30 such as a wired or wireless communication link, local area network, wide area network, the Internet, or a telephone link. Alternatively, on a periodic basis, the tune data could be provided to the computing system 50 on a computer readable media such as tape drive, DVD, CD-ROM, flash drive, mechanical or solid state hard drive, etc. While the tune data is depicted as being provided by the content presenter, in some embodiments the computing system 50 may receive the tune data from a data aggregator that interfaces with a number of content presenters. Moreover, in certain circumstances the computing system may receive the tune data directly from the set top boxes.

The computing system 50 analyzes the tune data to estimate viewership information. Authorized users 20, such as content producers, distributors, or advertisers, can access the computing system 50 via the computer communication link 30 or by other means to request reports about the viewership for a particular channel, program, or timeframe. The computing system 50 calculates the viewership information and can store the information in a data storage area 52, such as a database, to use when producing one or more reports that can be provided to the authorized users 20.

In many instances, a subscriber will leave their set top box continually powered on but will power off their video playback device when not in use. For example, a subscriber may leave their cable box powered on as a matter of habit even if they turn off their television. As another example, a subscriber may leave their set top box powered on to record a program when they are not home or are unable to watch the program in real time.

A large number of video playback devices do not provide a signal to the set top box that indicates when the video playback device is powered off. Therefore, for these video playback devices, it can appear in the tune data as if a subscriber is actually watching a program or channel but in fact the video playback device associated with a set top box is powered off. If the tune data associated with such set top boxes is included in the data analyzed to determine viewership information, the result would overstate the number of viewers that are estimated to be watching particular programs or channels.

As will be explained in further detail herein, the computing system 50 operates to identify one or more video playback devices that are likely to be powered off at any particular time such that the tune data from the set top boxes associated with the identified video playback devices can be omitted when estimating the viewership information. In some embodiments, the computing system 50 operates to identify one or more reliable set top boxes in the tune data provided from each content presenter. In some embodiments, each reliable set top box provides a signal to the content presenter that indicates when a video playback device associated with the set top box is powered off. Such information may be provided via a High Definition Multi-Media Interface (HDMI) connection between the set top box and the video playback device or by detection of another signal provided by the video playback device. From the reliable set top boxes identified, a set of survival curves is constructed and stored in a memory 54 of the computing system 50.

As will be explained in further detail herein, the survival curves estimate the likelihood that a video playback device remains powered on at any time between two consecutive tuning events or conversely is powered off at any time between two consecutive tuning events. In some embodiments, different sets of survival curves are constructed for each day of the week because the viewership patterns tend to change depending upon the day of the week and on weekends. Therefore, different survival curves can be constructed for different times of the day, as well as for different days of the week and if desired, for different seasons or the like. Moreover, different survival curves can be constructed for different channels (e.g., television network, cable network etc.) or types of programs (e.g., for sit-coms, news shows, movies, sporting events etc.). In accordance with one embodiment of the disclosed technology, the survival curves are used by the computing system 50 to identify tune data from set top boxes associated with video playback devices that are likely powered off.

Figure 2A:
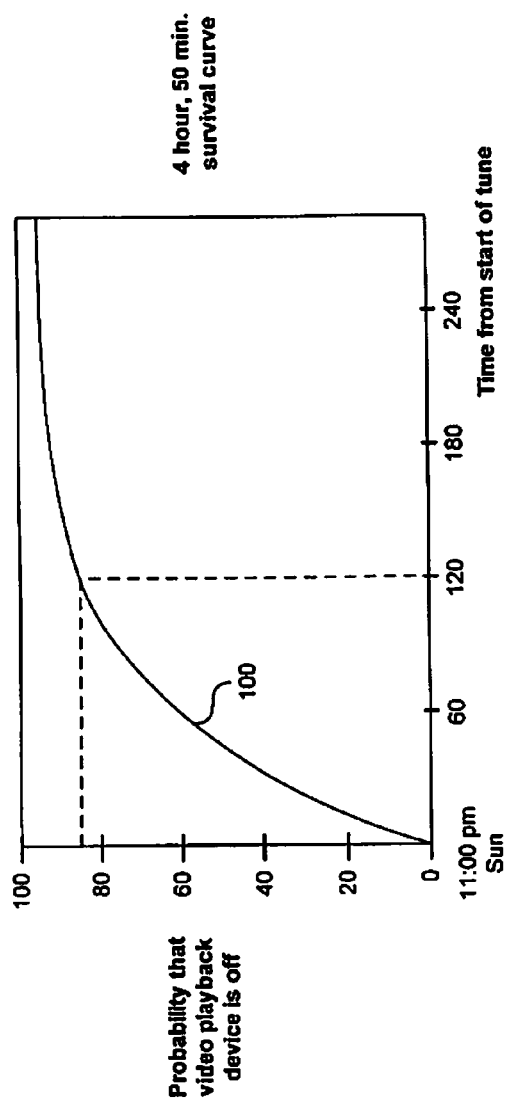
FIG. 2A illustrates a representative survival curve that can be used to predict if a television is powered on or off.

FIG. 2A illustrates a representative survival curve 100 generated for a particular time period such as a four hour and 50 minute time interval between consecutive tunes for that particular set top box. The survival curve 100 plots the probability versus time that a video playback device is powered off at any particular time following the first of two consecutive detected tuning events. In the example shown, the survival curve 100 is determined for a time period starting at 11:00 p.m. on Sunday evenings. In the example survival curve shown, the survival curve predicts 100 that there is an 84% likelihood that a video playback device associated with a set top box that reports a last tuning event at 11:00 p.m. is powered off within 120 minutes after the tuning event.

Figure 2B:
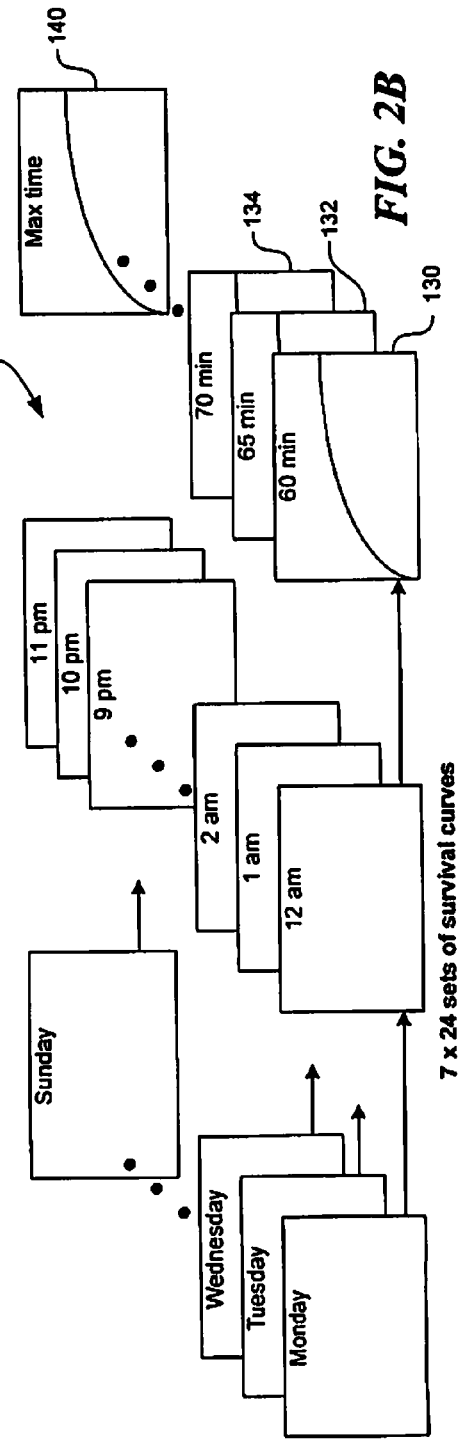
FIG. 2B illustrates a number of survival curves constructed for different days of the week and time periods in each day.

As shown in FIG. 2B, survival curves 120 can be constructed for each day of the week starting at each hour of the day. The result is 168 (7×24) sets of survival curves 120 constructed for each hour of the day and for each day of the week. In addition, each set of survival curves includes a number of individual survival curves constructed for different or varying periods of time (each period of time associated with corresponding tune-to-tune intervals). In some embodiments, survival curves for time periods of less than 60 minutes are not constructed because it has been statistically determined that the difference between the number of video playback devices that are powered on for a full hour and those that are powered off before the end of the hour is minimal. In some embodiments, separate survival curves are constructed for time intervals of five minute increases up to a maximum amount of time. For example, a survival curve 130 is constructed for a time interval of 60 minutes starting at 12 a.m. A survival curve 132 is constructed for a time interval of 65 minutes starting at 12 a.m. A survival curve 134 is constructed for a time interval of 70 minutes starting at 12 a.m., and a survival curve 140 is constructed for the maximum time interval starting at 12 a.m. The maximum time interval may be less than 24 hours such as 8 hours. Another set of individual survival curves can be constructed for various time intervals beginning at 1:00 a.m. and another set is constructed for various time intervals beginning at 2:00 a.m. etc. for each hour of the day. Although survival curves are graphically depicted in FIG. 2B, it will be appreciated that a survival curve may be represented or approximated by, for example, an equation or other mathematical model of the curve or a close fitting to the curve.

Figure 3:
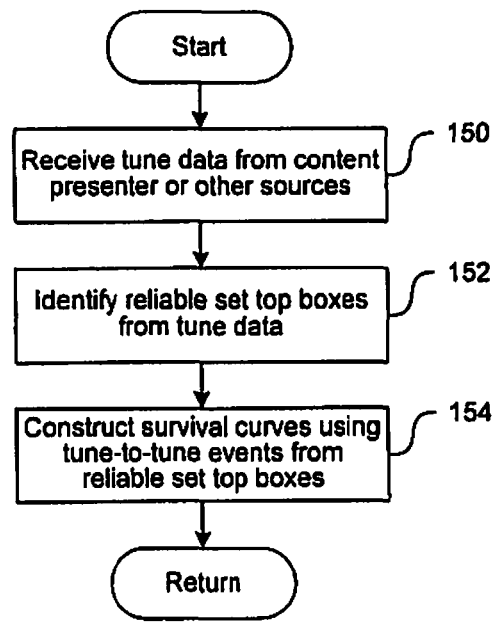
FIG. 3 is a flowchart of steps performed by a computing system to identify reliable set top boxes and to construct one or more survival curves.

FIG. 3 illustrates a process that is performed by the computing system 50 to generate the survival curves. Beginning at block 150, the computing system receives tune data from one or more content presenters or other sources. In some embodiments, tune data may be received for a relatively long period (e.g., three months) and include tuning events from millions of set top boxes. At block 152, the computing system 50 parses the tune data to identify reliable set top boxes from the tune data. In some embodiments, the reliable set top boxes are identified by those set top boxes that report at least one power off event per day and for which less than 1% of the tune-to-tune event times are 6 hours or longer. However, it will be appreciated that other criteria could be used to identify reliable set top boxes. At block 154, the computing system constructs the survival curves from the tuning events in the tune data that are associated with the identified reliable set top boxes.

Figure 4:
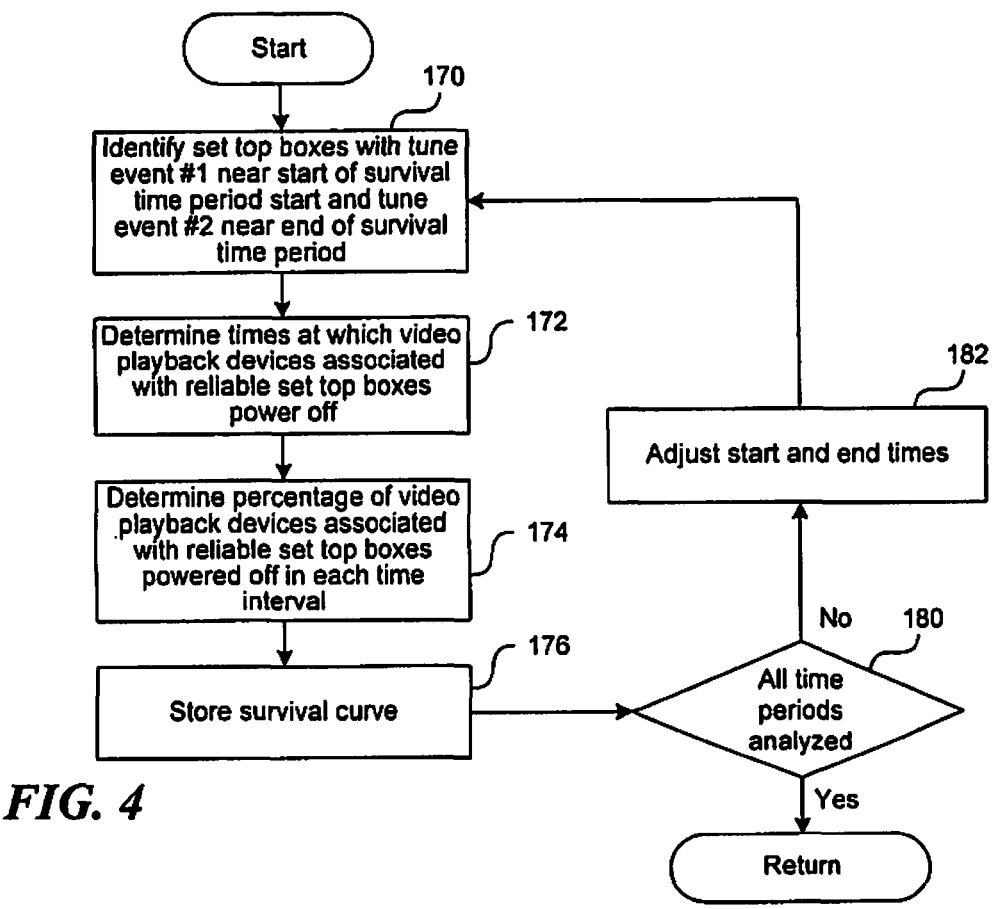
FIG. 4 is a flowchart of steps performed by a computing system to construct a number of survival curves.

FIG. 4 illustrates a process that is performed by the computing system 50 to construct a survival curve in accordance with an embodiment of the disclosed technology. Although the steps are disclosed in a particular order for ease of explanation, it will be appreciated that the steps could be performed in a different order or different steps performed in order to achieve the functionality described. As will be appreciated by those skilled in the art, the computing system 50 is configured to execute a sequence of program steps that are stored on a non-transitory, computer readable media for execution by one or more processors within the computing system.

Figure 5:
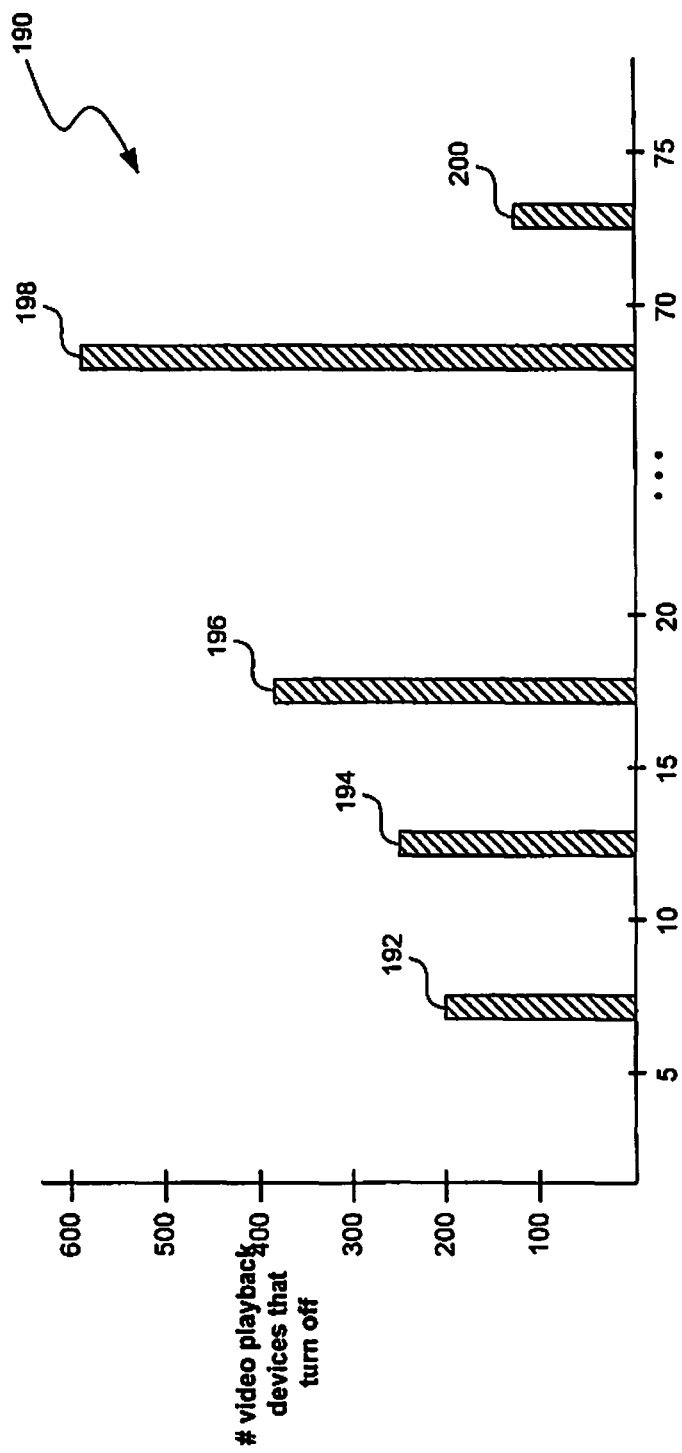
FIG. 5 illustrates a plot that can be used by a computing system to construct a survival curve.

As previously shown in FIG. 2B, sets of survival curves for varying survival time intervals are constructed starting for example, within each hour and for each day of the week. Returning to FIG. 4, at block 170 the computing system 50 analyzes the set top box tune data to determine reliable set top boxes that are associated with a first tuning event occurring near the beginning of a survival time interval and a second tuning event occurring near the end of the survival time interval. For example, if a 120 minute survival curve is to be computed for Tuesdays starting at 8:00 p.m., the computing system identifies reliable set top boxes reporting a first tuning event within the hour from 8:00 p.m. to 8:59:59 p.m. (the start of the survival time) and a second tuning event from the same set top box that occurs, for example, between 120 and 125 minutes later (the end of the survival time). At block 172, the computing system analyzes the times at which the video playback devices associated with the identified reliable set top boxes are powered off. In some embodiments, the power off information is included in the tuning event reported from the set top boxes. Such data can be based on HDMI signals received from the video playback device or other signals that indicate if the video playback device has been powered off. Which video playback devices are powered off can be continuously recorded or can be grouped within small time intervals, such as every five minutes. For example, FIG. 5 shows a graph 190 that plots the number of set top boxes that are determined to be powered off during each of a number of five minute intervals beginning at the start time of the survival time period up to the end time of the survival time period (75 minutes for the example shown). In the example shown, 200 video playback devices are determined to have been powered off in the first five minutes, 225 video playback devices are determined to have been powered off in the next five minutes, etc.

At block 174, the computing system 50 determines the percentage of video playback devices associated with the identified reliable set top boxes that are powered off in each time interval. The results are stored in a memory or on a computer readable media as the survival curve for the survival time period in question at block 176.

At block 180, the computing system 50 determines if all the survival time periods have been analyzed. If so, processing is complete. If not, the start and end times for the survival time period are adjusted at block 182 and processing returns to block 170 to compute another survival curve. The computing system 50 repeats blocks 170-176 to generate the desired sets of survival curves. For example, the computing system may construct survival curves starting at the beginning of each hour, for each day of the week, for different network and program types, and for survival intervals that range between 1 and 6 hours in increments of 5 minutes.

Once the set of survival curves are constructed from the tune data associated with the reliable set top boxes, the survival curves can be used to identify those video playback devices that do not report a power off event but are statistically likely to be powered off.

Figure 6:
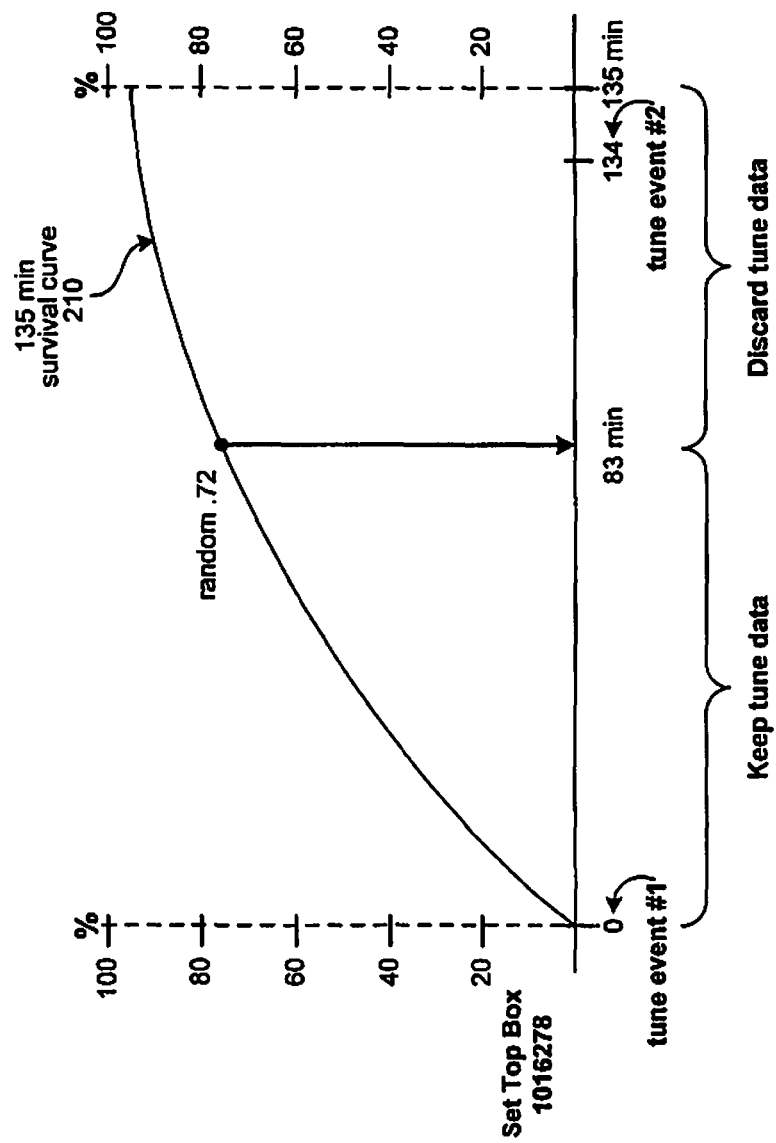
FIG. 6 illustrates how a survival curve can be used to predict if a television is powered off from tuning events in a tune data file.

FIG. 6 illustrates an example where tune data associated with set top box number 1016278 has tuning events that occur 134 minutes apart. To predict whether a video playback device associated with the set top box number 1016278 is powered on or is powered off, the computing system 50 identifies a previously-generated survival curve having a beginning time closest to the first tuning event for the set top box in question and an end time which is closest to the second tuning event. In the example shown, a survival curve 210 having a 135 minute time interval is selected. Once the appropriate survival curve has been selected, the computing system implements a statistical technique to determine where on the survival curve the video playback device associated with the set top box number 1016278 is likely to fall.

In some embodiments of the disclosed technology, the computing system 50 uses a Monte Carlo technique to guarantee that the probability distribution function of adjusted tune lengths matches the empirical distribution determined from the reliable set top boxes. The Monte Carlo technique is implemented by selecting a uniformly-distributed random number between zero and one that represents the probability that the corresponding video playback device is powered off. In the example shown, the random number generated is 0.72 (e.g., a 72% likelihood that the video playback device is powered off). Next, the survival curve 210 is analyzed to determine what time corresponds to the randomly selected probability that the video playback device is powered off. In the example shown in FIG. 6, the 72% likelihood that a video playback device is powered off corresponds to a time period of 83 minutes after the first tuning event. Therefore, the tune data for the video playback device associated with set top box 1016278 can be assumed to be valid for the first 83 minutes and invalid for minutes 83-134. When applied to data representing a large number of set top boxes, the disclosed statistical technique closely approximates actual tune information. Although the disclosed embodiment uses a Monte Carlo technique to predict whether a video playback device is powered on or is powered off, it will be appreciated that other statistical techniques could also be used.

Figure 7:
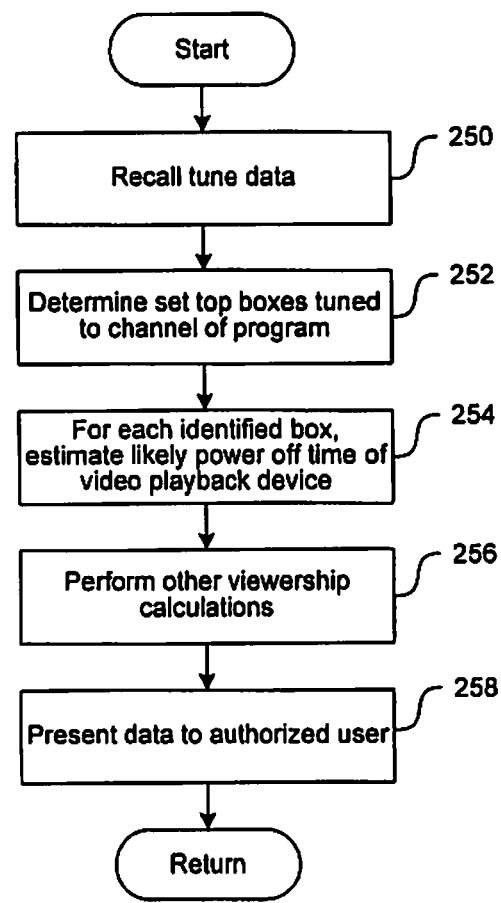
FIG. 7 is a flowchart of steps performed by a computing system to estimate viewership information for a program from tune data associated with a number of set top boxes.

FIG. 7 illustrates a process that can be performed by the computing system 50 in order to analyze received tune data in order to estimate viewership information. For example, an authorized user of the computing system 50 may be interested in estimating the number of viewers who saw an episode of the show "Modern Family," which airs on ABC on Wednesday nights at 8:00 p.m. Pacific time. To estimate the number of likely viewers, at a block 250 the computing system 50 receives tune data covering the period of interest from one or more content presenters (or recalls the tune data from a computer readable media). At a block 252, the computing system 50 searches the tune data to identify those set top boxes that appear to have been tuned to the channel on which the program in question was presented. By doing so, the computing system determines a maximum number of video playback devices that are potentially tuned to the program of interest. The maximum number then needs to be reduced by the number of video playback devices that are predicted to be powered off during any portion of the relevant period.

At a block 254, the computing system predicts whether each of the identified set top boxes associated with a video playback device was likely powered on or was likely powered off during the relevant period. In some embodiments, the computing system estimates if the video playback devices represented in the tune data were powered on or were powered off by identifying tuning events reported by the associated set top box that include the time during which the show was broadcast. For example, if the show Modern Family is presented on cable channel 40 at 8 p.m. and is one hour long, then the computing system 50 can search the tune data for set top boxes tuned to channel 40 at some time between 8 and 9 p.m. For each identified set top box, the closest tuning events are identified that fall before, during, or after the period during which the program was presented. In particular, the computing system 50 may search for first tuning events that start before the end of the program and second tuning events that start after the start of the program. For example, a first tuning event for a set top box may be to tune to channel 40 at 7:50 p.m. and a second tuning event may occur at 9:05. The time between the tuning events is then determined (e.g., 75 minutes) and the survival curve that begins nearest the first tuning event is selected having a survival time length that includes the second tuning event. In this example, a survival curve starting at 8 p.m. is selected having a length of 75 minutes. Once the computing system 50 has selected a survival curve, the computing system uses the selected curve to predict the time at which the video playback device associated with the identified set top box is likely powered off. Any viewership determinations made by the computing system 50 can then be adjusted for the times during which the identified video playback devices are predicted to be powered off. At a block 256, other adjustments may be made to the viewership data before it is presented to an authorized user. For example, the selected set of data may represent only certain markets or only portions of the markets. In order to present complete viewership data, the computing system 50 would therefore need to extrapolate the results for those markets or portions of markets for which no viewership data is available. At a block 258 the computing system presents the resulting viewership information to authorized users. The information may be presented, for example, via an online portal or other user interface, transferred via email or other electronic delivery system or printed in hard copy.

In some embodiments, tuning events caused by the automatic recording of programs (e.g., programs that are recorded by virtue of a subscriber's prior record settings of a DVR) can be distinguished from tuning events associated with instructions received from a subscriber. In circumstances in which a program was recorded automatically, the tune data that is received by the computing device may include an indication that a show was automatically recorded. The tuning events associated with these automatic channel changes can therefore be factored in when estimating the number of viewers who watched a show as it was aired. In some cases, it may be necessary to revise the viewership numbers downward since not every person that records a show will ultimately watch the recording.

Embodiments of the subject matter described in this specification can be implemented as one or more computer programs, i.e., one or more modules of computer program instructions, encoded on computer storage medium for execution by, or to control the operation of, data processing apparatus. A computer storage medium can be, or can be included in, a non-transitory computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices). The operations described in this specification can be implemented as operations performed by a processor on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A computing system for analyzing video playback device viewing data, comprising:
   a memory for storing programmed instructions;
   a processor configured to execute the programmed instructions to perform operations including:
      maintaining multiple survival models, each survival model associated with a portion of a day, of a plurality of portions of the day, and comprising a plurality of probabilities in the open interval between 0 and 1 that a video playback device associated with a set top box is powered off as a function of time following a tuning event, each survival model generated from tune data from a plurality of set top boxes, the tune data associated with the corresponding portion of the day;
      receiving tune data indicative of content tuned to by a plurality of set top boxes, the tune data including a plurality of tuning events, each tuning event including a time of the tuning event and a corresponding content identifier that was tuned at the tuning event; and
      analyzing the tune data from the plurality of set top boxes to estimate video viewership, the analysis including, for each set top box of the plurality of set top boxes:
         selecting a survival model from the multiple survival models, the selected survival model corresponding to a same portion of the day as reflected by at least one of the tuning events from the set top box;
         selecting a probability that the video playback device associated with the set top box was powered off;
         determining a time corresponding to the probability using the selected survival model; and
         excluding, from the analysis to estimate video viewership, tuning data from the set top box that occurs after the determined time.

2. The computing system of claim 1, wherein the survival models are generated by:
   analyzing tune data from the plurality of set top boxes to assess when associated video playback devices are powered off; and
   compiling statistics predicting the length of time before a video playback device is powered off after a tuning event, wherein the statistics are compiled from the analyzed tune data.

3. The computing system of claim 2, wherein the statistics regarding a length of time before a video playback device is powered off are compiled by detecting power off signals in the tune data from the plurality of set top boxes.

4. The computing system of claim 2, wherein the statistics regarding a length of time before a video playback device is powered off are compiled by:
   identifying a number of reliable set top boxes in the tune data; and
   detecting power off signals in the tune data from the reliable set top boxes.

5. The computing system of claim 2, wherein the statistics that predict a length of time before a video playback device is powered off are compiled by analyzing the tune data for times between two successive tuning events and a power off signal received from a video playback device between those two successive tuning events.

6. The computing system of claim 5, wherein the statistics are compiled for different times of a day.

7. The computing system of claim 5, wherein the statistics are compiled for different days of a week.

8. The computing system of claim 5, wherein the statistics are compiled for different months of a year.

9. The computing system of claim 5, wherein the statistics are compiled for types of broadcast programs.

10. The computing system of claim 5, wherein the statistics are compiled for types of networks.

11. A non-transitory, computer readable media with instructions stored thereon that are executable by a processor to perform operations of:
   maintaining multiple survival models, each survival model associated with a portion of a day, of a plurality of portions of the day, and comprising a plurality of probabilities in the open interval between 0 and 1 that a video playback device associated with a set top box is powered off as a function of time following a tuning event, each survival model generated from tune data from a plurality of set top boxes, the tune data associated with the corresponding portion of the day;

receiving tune data indicative of content tuned to by a plurality of set top boxes, the tune data including an identification of each of the set top boxes of the plurality of set top boxes and a plurality of tuning events, each tuning event including a time of the tuning event and a corresponding content identifier that was tuned at the tuning event; and analyzing the tune data from the plurality of set top boxes to estimate video viewership, the analysis including, for each set top box of the plurality of set top boxes:

selecting a survival model from the multiple survival models, the selected survival model corresponding to a same portion of the day as reflected by at least one of the tuning events from the set top box;

selecting a probability that the video playback device associated with the set top box was powered off;

determining a time corresponding to the probability using the at least one survival model; and excluding, from the analysis to estimate video viewership, tuning data from the set top box that occurs after the determined time.

12. The non-transitory computer readable media of claim 11, wherein the survival models are generated by:

analyzing tune data from the plurality of set top boxes to assess when associated video playback devices are powered off; and compiling statistics predicting the length of time before a video playback device is powered off after a tuning event, wherein the statistics are compiled from the analyzed tune data.

13. The non-transitory computer readable media of claim 12, wherein compiling statistics predicting a length of time before a video playback device is powered off after a tuning event includes the operation of detecting power off signals in the tune data.

14. The non-transitory computer readable media of claim 12, wherein compiling statistics predicting a length of time before a video playback device is powered off after a tuning event includes the operations of:

identifying a number of reliable set top boxes in the tune data; and detecting power off signals in the tune data from the reliable set top boxes.

15. A computer-implemented method of analyzing tune data, comprising:

maintaining multiple survival models, each survival model associated with a portion of a day, of a plurality of portions of the day, and comprising a plurality of probabilities in the open interval between 0 and 1 that a video playback device associated with a set top box is powered off as a function of time following a tuning event, each survival model generated from tune data from a plurality of set top boxes, the tune data associated with the corresponding portion of the day;

receiving with the computer, tune data from a plurality of set top boxes, the tune data including a plurality of tuning events, each tuning event including a time of the tuning event and a corresponding content identifier that was tuned at the tuning event; and analyzing, with the computer, the tune data from the plurality of set top boxes to estimate video viewership, the analysis including, for each set top box of the plurality of set top boxes:

selecting a survival model from the multiple survival models, the selected survival model corresponding to a same portion of the day as reflected by at least one of the tuning events from the set top box;

selecting a probability that the video playback device associated with the set top box was powered off;

determining a time corresponding to the probability using the at least one survival model; and excluding from at least a portion of an analysis the tuning data from the set top box that occurs after the determined time.

16. The computer-implemented method of claim 15, wherein the multiple survival models are generated by:

constructing, with the computer, survival curves that indicate a likelihood that a video playback device is powered off within a time interval after a tuning event, wherein the survival curves are constructed from set top boxes that report a power off event in the tune data; and using the survival curves to identify, with the computer, one or more set top boxes that do not report power off events in the tune data and that are associated with video playback devices that are likely powered off.

17. The computer-implemented method of claim 16, wherein the survival curves are constructed by the computer for different hours of the day.

18. The computer-implemented method of claim 16, wherein the survival curves are constructed by a computer for different days of the week or months of the year.

19. The computer-implemented method of claim 16, wherein the survival curves are constructed by a computer for different types of broadcast programs.

20. The computer-implemented method of claim 16, wherein the survival curves are constructed by a computer for different types of networks.

21. The computer-implemented method of claim 16, wherein a computer adjusts viewership estimates for the tune data from set top boxes associated with video playback devices that are identified as likely being powered off.

22. The computing system of claim 1, wherein selecting a survival model from the multiple survival models, the selected survival model corresponding to a same portion of the day as reflected by at least one of the tuning events from the set top box comprises determining that a beginning time of the at least one survival model is closer to the first tuning event of the tuning events than beginning times of the other multiple survival models.

23. The non-transitory, computer readable media of claim 11, wherein selecting a survival model from the multiple survival models, the selected survival model corresponding to a same portion of the day as reflected by at least one of the tuning events from the set top box comprises determining that a beginning time of the at least one survival model is closer to the first tuning event of the tuning events than beginning times of the other multiple survival models.

24. The computer-implemented method of claim 15, wherein selecting a survival model from the multiple survival models, the selected survival model corresponding to a same portion of the day as reflected by at least one of the tuning events from the set top box comprises determining that a beginning time of the at least one survival model is closer to the first tuning event of the tuning events than beginning times of the other multiple survival models.

25. The computing system of claim 1, wherein selecting a probability comprises a portion of a Monte Carlo technique to guarantee that a probability distribution function of adjusted tune lengths matches an empirical distribution determined from reliable set top boxes.

26. The non-transitory, computer readable media of claim 11, wherein selecting a probability comprises a portion of a Monte Carlo technique to guarantee that a probability distribution function of adjusted tune lengths matches an empirical distribution determined from reliable set top boxes.

27. The computer-implemented method of claim 15, wherein selecting a probability comprises a portion of a Monte Carlo technique to guarantee that a probability distribution function of adjusted tune lengths matches an empirical distribution determined from reliable set top boxes.

* * * * *